(12) United States Patent
Le et al.

(10) Patent No.: US 11,875,827 B2
(45) Date of Patent: Jan. 16, 2024

(54) SOT READER USING BISB TOPOLOGICAL INSULATOR

(71) Applicants: Western Digital Technologies, Inc., San Jose, CA (US); Tokyo Institute of Technology, Tokyo (JP)

(72) Inventors: Quang Le, San Jose, CA (US); Brian R. York, San Jose, CA (US); Xiaoyong Liu, San Jose, CA (US); Son T. Le, San Jose, CA (US); Cherngye Hwang, San Jose, CA (US); Michael A. Gribelyuk, San Jose, CA (US); Xiaoyu Xu, San Jose, CA (US); Kuok San Ho, Emerald Hills, CA (US); Hisashi Takano, San Jose, CA (US); Julian Sasaki, Tokyo (JP); Huy H. Ho, Tokyo (JP); Khang H. D. Nguyen, Tokyo (JP); Nam Hai Pham, Tokyo (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/705,147

(22) Filed: Mar. 25, 2022

(65) Prior Publication Data

US 2023/0306993 A1 Sep. 28, 2023

(51) Int. Cl.
*G11B 5/39* (2006.01)
*G11B 5/00* (2006.01)

(52) U.S. Cl.
CPC ........ *G11B 5/39* (2013.01); *G11B 2005/0021* (2013.01); *G11B 2005/3996* (2013.01)

(58) Field of Classification Search
None
See application file for complete search history.

(56) References Cited

U.S. PATENT DOCUMENTS 5,751,521 A 5/1998 Gill
6,657,823 B2 12/2003 Kawato
(Continued)

FOREIGN PATENT DOCUMENTS

CN 111354392 A * 6/2020
JP 4934582 B2 5/2012
(Continued)

OTHER PUBLICATIONS

Tuo Fan et al. "Ultrahigh Efficient Spin-Orbit Torque Magnetization Switching in All-Sputtered Topological Insulator—Ferromagnet Multilayer", Jul. 5, 2020, <https://arxiv.org/ftp/arxiv/papers/2007/2007.02264.pdf.
(Continued)

*Primary Examiner* — William J Klimowicz
(74) *Attorney, Agent, or Firm* — PATTERSON + SHERIDAN, LLP; Steven H. VerSteeg

(57) ABSTRACT

The present disclosure generally relate to spin-orbit torque (SOT) devices. The SOT devices each comprise a non-magnetic layer, a free layer disposed in contact with the non-magnetic layer, and a bismuth antimony (BiSb) layer disposed over the free layer. The non-magnetic layer has a thickness of about 0.5 nm to about 2 nm. The BiSb layer has a thickness of about 5 nm to about 10 nm. The BiSb layer and the free layer have collective thickness between about 5 nm to about 20 nm. By reducing the thickness of the non-magnetic layer and BiSb layer, a read gap of each SOT device is reduced while enabling large inverse spin Hall angles and high signal-to-noise ratios.

29 Claims, 12 Drawing Sheets

(56) References Cited

U.S. PATENT DOCUMENTS

| | | |
|---|---|---|
| 6,667,861 B2 | 12/2003 | Gill |
| 6,680,828 B2 | 1/2004 | Gill |
| 6,906,898 B2 | 6/2005 | Kawato |
| 7,016,160 B2 | 3/2006 | Mao et al. |
| 7,242,556 B2 | 7/2007 | Gill |
| 7,298,595 B2 | 11/2007 | Gill |
| 7,436,632 B2 | 10/2008 | Li et al. |
| 7,643,255 B2 | 1/2010 | Gill et al. |
| 7,697,242 B2 | 4/2010 | Gill |
| 7,881,018 B2 | 2/2011 | Gill et al. |
| 8,125,746 B2 | 2/2012 | Dimitrov et al. |
| 8,174,799 B2 | 5/2012 | Hoshiya et al. |
| 8,223,464 B2 | 7/2012 | Yasui et al. |
| 8,553,346 B2 | 10/2013 | Braganca et al. |
| 8,570,677 B2 | 10/2013 | Braganca et al. |
| 8,570,689 B2 | 10/2013 | Sato et al. |
| 8,654,465 B2 | 2/2014 | Braganca et al. |
| 9,472,216 B1 | 10/2016 | Mauri et al. |
| 9,806,710 B2 | 10/2017 | Flatte |
| 9,929,210 B2 | 3/2018 | Lai et al. |
| 9,947,347 B1 | 4/2018 | Van Der Heijden et al. |
| 10,014,012 B1 | 7/2018 | Song et al. |
| 10,127,933 B2 | 11/2018 | Batra et al. |
| 10,210,888 B1 | 2/2019 | Li et al. |
| 10,483,457 B1 | 11/2019 | Lee et al. |
| 10,490,731 B2 | 11/2019 | Sasaki et al. |
| 10,720,570 B2 | 7/2020 | Le et al. |
| 10,839,831 B1 * | 11/2020 | Nguyen ............... G11B 5/3133 |
| 10,867,626 B1 * | 12/2020 | Li ............... G11B 5/1278 |
| 10,991,390 B2 | 4/2021 | Kobayashi |
| 11,088,200 B1 | 8/2021 | Xiao |
| 11,094,338 B1 * | 8/2021 | Hwang ............... G11B 5/11 |
| 11,100,946 B1 | 8/2021 | Le et al. |
| 11,222,656 B1 | 1/2022 | Le et al. |
| 11,495,741 B2 * | 11/2022 | York ............... H10N 52/00 |
| 11,532,323 B1 | 12/2022 | Le et al. |
| 2011/0089940 A1 | 4/2011 | Carey et al. |
| 2014/0226239 A1 | 8/2014 | Mihajlovic et al. |
| 2014/0254252 A1 | 9/2014 | Guo |
| 2015/0041934 A1 | 2/2015 | Khvalkovskiy et al. |
| 2015/0287426 A1 | 10/2015 | Mihajlovic et al. |
| 2017/0077392 A1 | 3/2017 | Han et al. |
| 2017/0098545 A1 | 4/2017 | Woodruff |
| 2017/0221506 A1 | 8/2017 | Tan et al. |
| 2017/0271581 A1 | 9/2017 | Seong et al. |
| 2017/0288666 A1 | 10/2017 | Flatte |
| 2017/0365777 A1 | 12/2017 | Mihajlovic et al. |
| 2018/0166500 A1 | 6/2018 | Wang et al. |
| 2018/0358543 A1 * | 12/2018 | Le ............... G11B 5/3903 |
| 2018/0366172 A1 | 12/2018 | Wang et al. |
| 2019/0037703 A1 | 1/2019 | Wang et al. |
| 2019/0058113 A1 | 2/2019 | Ramaswamy et al. |
| 2019/0326353 A1 | 10/2019 | O'Brien et al. |
| 2019/0392881 A1 | 12/2019 | Rakshit et al. |
| 2020/0035910 A1 | 1/2020 | Li et al. |
| 2020/0098410 A1 | 3/2020 | Gosavi et al. |
| 2020/0176511 A1 | 6/2020 | Park et al. |
| 2020/0243603 A1 | 7/2020 | Lee et al. |
| 2020/0243752 A1 | 7/2020 | Sasaki |
| 2020/0279992 A1 * | 9/2020 | Pham ............... H01L 27/105 |
| 2021/0056988 A1 | 2/2021 | Chen et al. |
| 2021/0249038 A1 * | 8/2021 | Le ............... H10N 50/10 |
| 2021/0328134 A1 * | 10/2021 | Guo ............... H10N 50/01 |
| 2021/0336127 A1 * | 10/2021 | Le ............... H10N 52/00 |
| 2021/0351342 A1 | 11/2021 | Yui et al. |
| 2021/0367142 A1 | 11/2021 | Lee et al. |
| 2021/0408370 A1 | 12/2021 | York et al. |
| 2022/0005498 A1 | 1/2022 | Le et al. |
| 2022/0013138 A1 * | 1/2022 | Hwang ............... G11B 5/11 |
| 2022/0029090 A1 | 1/2022 | Cho et al. |
| 2022/0044103 A1 * | 2/2022 | Nguyen ............... H10B 61/00 |
| 2022/0068538 A1 | 3/2022 | Apalkov et al. |
| 2022/0069202 A1 * | 3/2022 | Nguyen ............... G11C 11/161 |
| 2023/0027086 A1 * | 1/2023 | Le ............... G11B 5/3909 |
| 2023/0047223 A1 * | 2/2023 | Le ............... H10N 52/00 |

FOREIGN PATENT DOCUMENTS

| | | | |
|---|---|---|---|
| JP | 2021034480 A * | 3/2021 | |
| JP | 2021057357 A * | 4/2021 | |
| JP | 2021057357 A | 4/2021 | |
| JP | 2021128814 A * | 9/2021 | ............... G11B 5/11 |
| WO | 2018231292 A1 | 12/2018 | |
| WO | 2019054484 A1 | 3/2019 | |
| WO | 2019125388 A1 | 6/2019 | |
| WO | 2019159885 A1 | 8/2019 | |
| WO | WO-2023022764 A1 * | 2/2023 | ............... G11B 5/313 |

OTHER PUBLICATIONS

International Search Report and Written Opinion for International Application No. PCT/US2022/027960 dated Sep. 5, 2022.

Zhang et al. (NPJ Computational Materials, 2021, 167, pp. 1-7) (Year: 2021).

"A colossal breakthrough for topological spintronics," Tokyo Institute of Technology, Jul. 31, 2018, 4 pages, <https://www.titech.ac.jp/english/news/2018/042001.html>.

Berry et al. "Melting at dislocations and grain boundaries: A phase field crystal study," Physical Review, vol. B 77, No. 224114, 2008, pp. 224114-1-224114-5, DOI: 10.1103/PhysRevB.77.224114.

Buffat et al. "Size effect on the melting temperature of gold particles," Physical Review A, vol. 13, No. 6, Jun. 1976, pp. 2287-2298.

Cantwell et al. "Grain boundary complexions," ScienceDirect, Acta Materialia, vol. 62, No. 152, 2014, pp. 1-48, http://dx.doi.org/10.1016/j.actamat.2013.07.037.

Chi et al. "The Spin Hall Effect of Bi—Sb Alloys Driven by Thermally Excited Dirac-like Electronics," Oct. 28, 2019, ArXiv: 1910, 40 pages, https://arxiv.org/pdf/1910.12433.pdf.

Eustathopoulos "Wetting by Liquid Metals-Application in Materials Processing: The Contribution of the Grenoble Group," Metals, 2015, vol. 5, No. 1, pp. 350-370, doi:10.3390/met5010350.

Fan et al. "Magnetization switching through giant spin-orbit torque in a magnetically doped topological insulator heterostructure," Nature Materials, vol. 13, Apr. 28, 2014, pp. 669-704, << https://doi.org/10.1038/nmat3973>>.

Frolov et al. "Structural phase transformations in metallic grain boundaries," Nature Communications, 2013, vol. 4, No. 1899, pp. 1-7, DOI: 10.1038/ncomms2919.

Han et al. "Self-Biased Differential Dual Spin Valve Readers for Future Magnetic Recording," IEEE Transactions on Magnetics, vol. 48, No. 5, May 2012, pp. 1770-1776, 10.1109/TMAG.2011.2169946.

International Search Report and the Written Opinion for International Application No. PCT/US2020/065156 dated Mar. 14, 2021, 13 pages.

International Search Report and the Written Opinion for International Application No. PCT/US2020/066902 dated Apr. 18, 2021, 12 pages.

International Search Report and the Written Opinion for International Application No. PCT/US2021/033197 dated Jul. 12, 2021, 9 pages.

International Search Report and the Written Opinion for International Application No. PCT/US2021/033912 dated Jul. 25, 2021, 9 pages.

Khang et al. "A Colossal Breakthrough for Topological Spintronics: BiSb Expands the Potential of Topological Insulators for Ultra-Low-Power Electronic Devices" Nature Materials, 2018, 4 pages, https://www.titech.ac.jp/english/news/2018/042001.html.

Khang et al. "A conductive topological insulator with large spin Hall effect for ultralow power spin-orbit torque switching," Nature Materials, vol. 17, pp. 808-813, Sep. 2018, pp. 808-813, https://doi.org/10.1038/s41563-018-0137-y.

Kogtenkova et al. "Grain Boundary Complexions and Phase Transformations in Al- and Cu-Based Alloys," Metals, 2019, vol. 9, No. 1, doi:10.3390/met9010010, 24 pages.

Kotb et al. "Study of spin transfer torque (STT) and spin orbit torque (SOT) magnetic tunnel junctions (MTJs) at advanced CMOS tech-

(56) References Cited

OTHER PUBLICATIONS nology nodes," Electrical and Electronics Engineering: An International Journal, (ELELIJ) vol. 6, No. 1, Feb. 2017, pp. 1-9, 10.14810/elelij.2017.6101.

Lau et al. "Spin-orbit torque switching without an external field using interlayer exchange coupling," Nature Nanotechnology, vol. 11, Sep. 2016, pp. 758-762, <https://doi.org/10.1038/nnano.2016.84>.

Iu "Spin-orbit Torque Driven Magnetization Switching for Nonvolatile Memory and Beyond," Carnegie Mellon University, May 2020, Thesis, 157 pages, <https://doi.org/10.1184/R1/11933571.v1>, <https://kilthub.cmu.edu/articles/Spinorbit_Torque_Driven_Magnetization_Switching_for_Nonvolatile_Memory_and_Beyond/11933571/files/21908046.pdf>.

Roschewsky et al. "Spin-orbit torque and Nernst effect in Bi—Sb/Co heterostructures," Physical Review, vol. B 99, No. 195103, 2019, pp. 195103-1-195103-5, DOI: 10.1103/PhysRevB.99.195103.

Roschewsky et al. "Spin-Orbit Torque and Nernst Effect in BiSb/Co Heterostructures," Center for Energy Efficient Electronics Science, University of California—Berkeley, 2018, 12 pages, https://e3s-center.berkeley.edu/wp-content/uploads/2018/11/43Theme-4_Roschewsky_2018E3Sretreat.pdf.

Shao "Spin-Orbit Torques in Topological Insultators," UCLA Electronic Theses and Dissertations; 2015; 76 pages, https://escholarship.org/content/qt3ds9792s/qt3ds9792s.pdf?t=nys1b5&nosplash=32ac004cc5750a361e60ece735dd2752.

Tanaka et al. "Thermodynamic Evaluation of Nano-Particle Binary Alloy Phase Diagrams," 2001, Zeitschrift für Metallkunde, vol. 92, No. 11, pp. 1236-1241, http://hdl.handle.net/11094/26514.

Teague "X-ray and Mossbauer spectroscopy studies of the silicon-antimony and bismuth-antimony alloys," 1971, Scholar's Mine, Doctoral Dissertations, University of Missouri-Rolla, 167 pages.

U.S. Appl. No. 17/401,856, filed Aug. 13, 2021.

U.S. Appl. No. 17/405,954, filed Aug. 18, 2021.

Walker et al. "Composition-dependent structural transition in epitaxial $Bi_{1-x}Sb_x$ thin films on Si (111)," Physical Review Materials, vol. 3, 064201, Jun. 7, 2019, 8 pages.

Yao et al. "Influence of Crystal Orientation and Surface Termination on the Growth of BiSb thin films on GaAs Substrates," Accepted Manuscript, Journal of Crystal Growth, 2019, 24 pages, doi: https://doi.org/10.1016/j.crysgro.2019.01.041.

Yuan et al. "Readback Resolution of Differential Dual CPP Spin Valve Reader," IEEE Transactions on Magnetics, vol. 16, No. 6, Jun. 2010, pp. 1667-1670, 10.1109/TMAG.2010.2045106.

\* cited by examiner

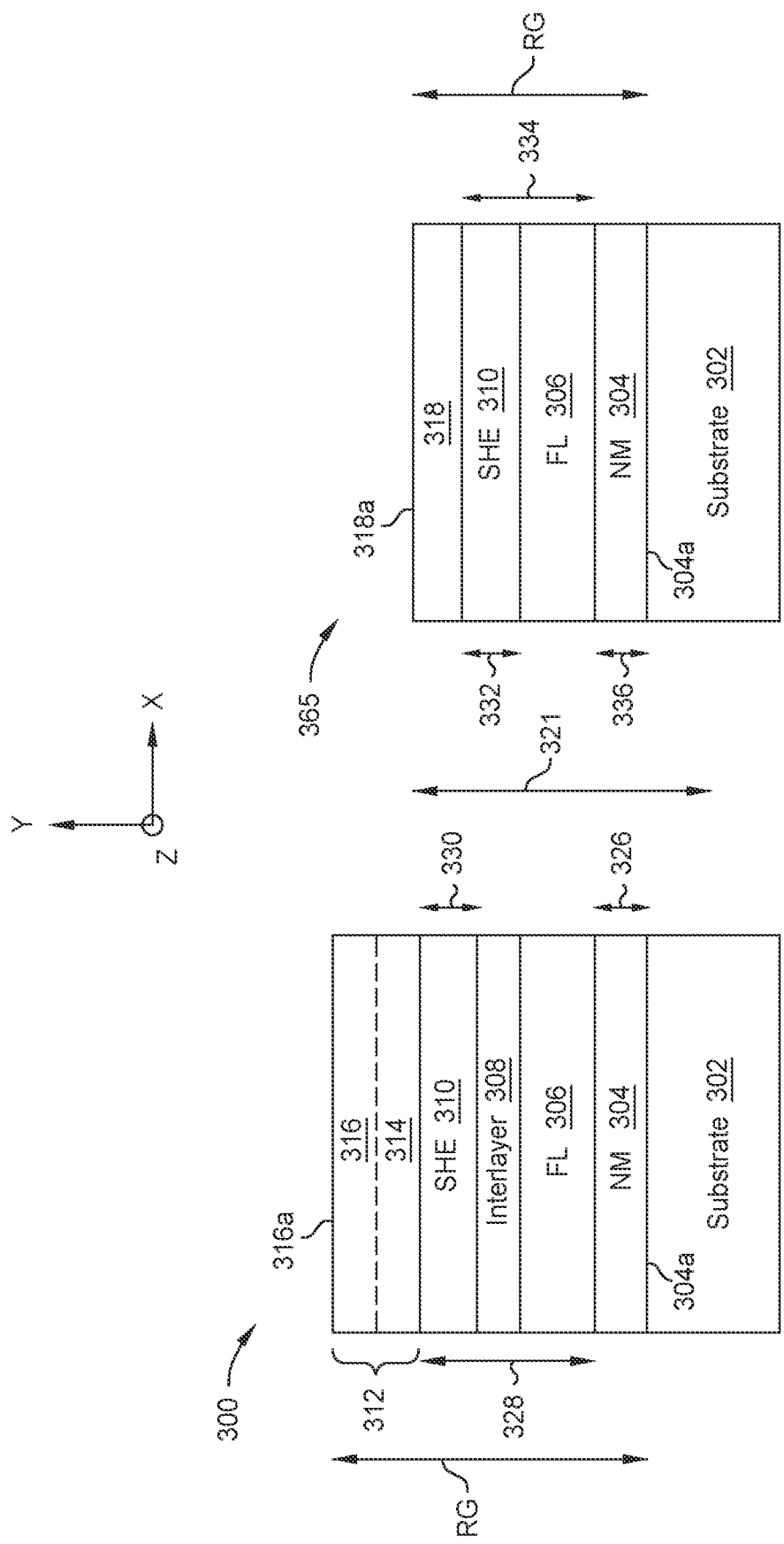

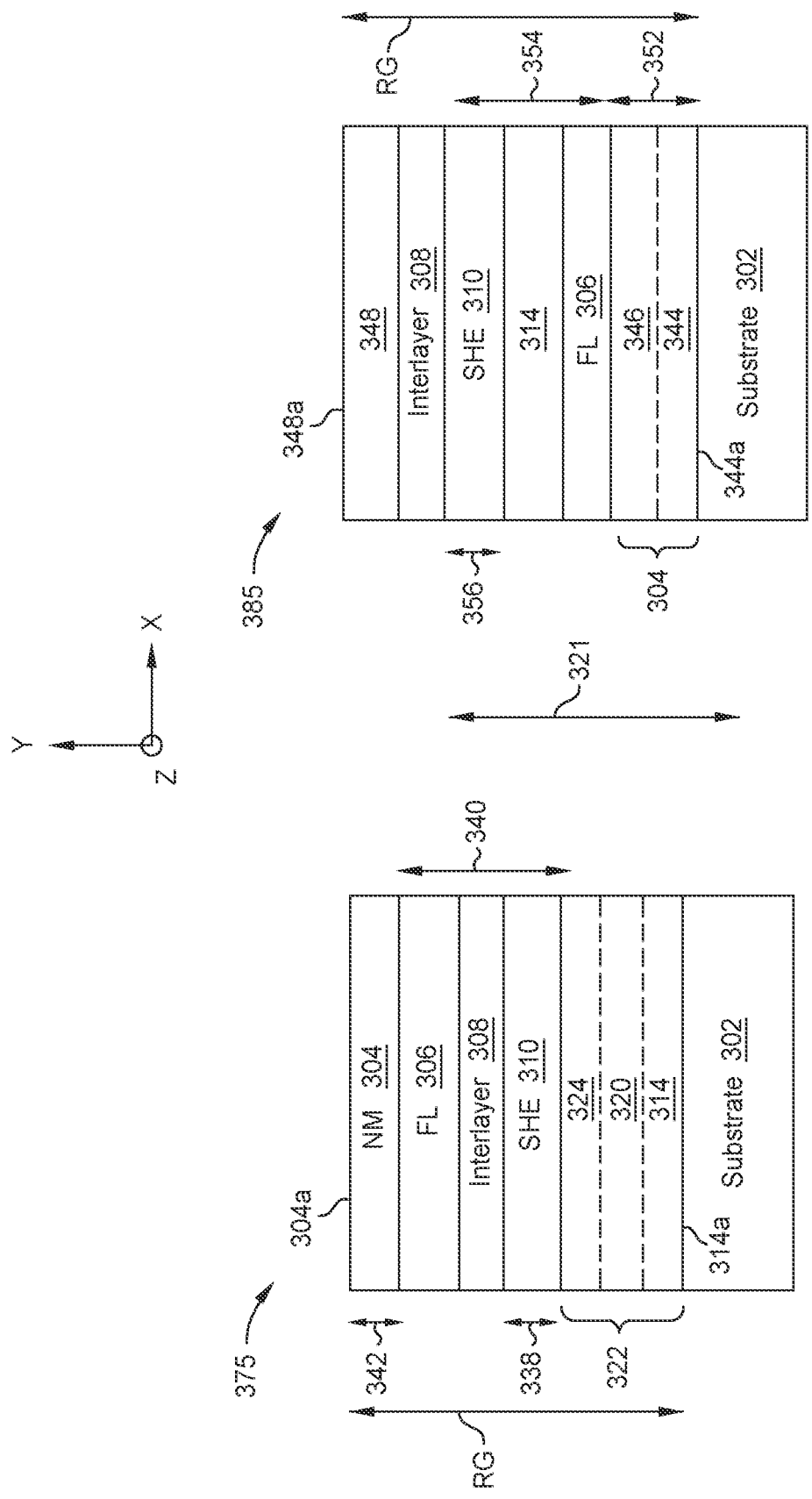

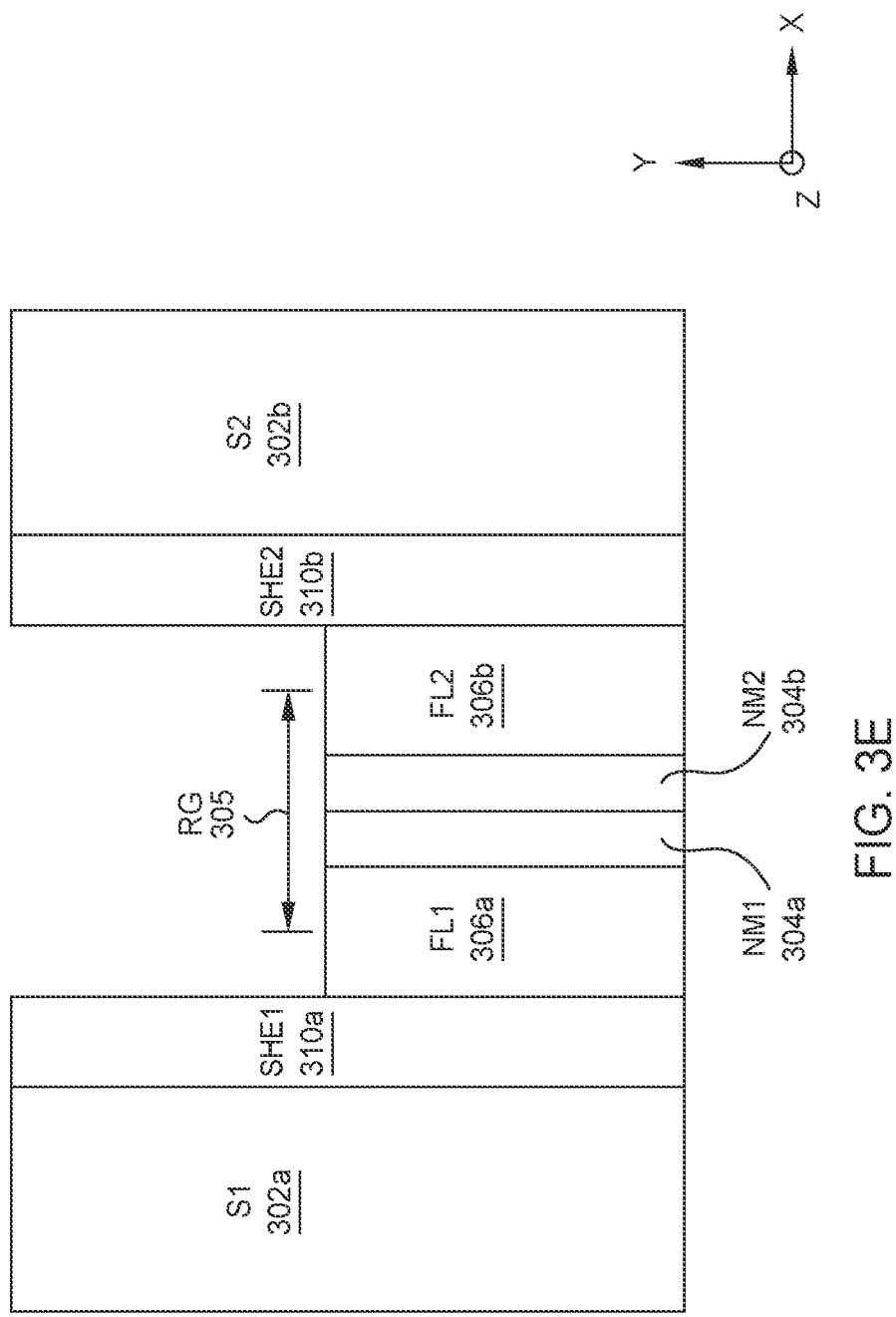

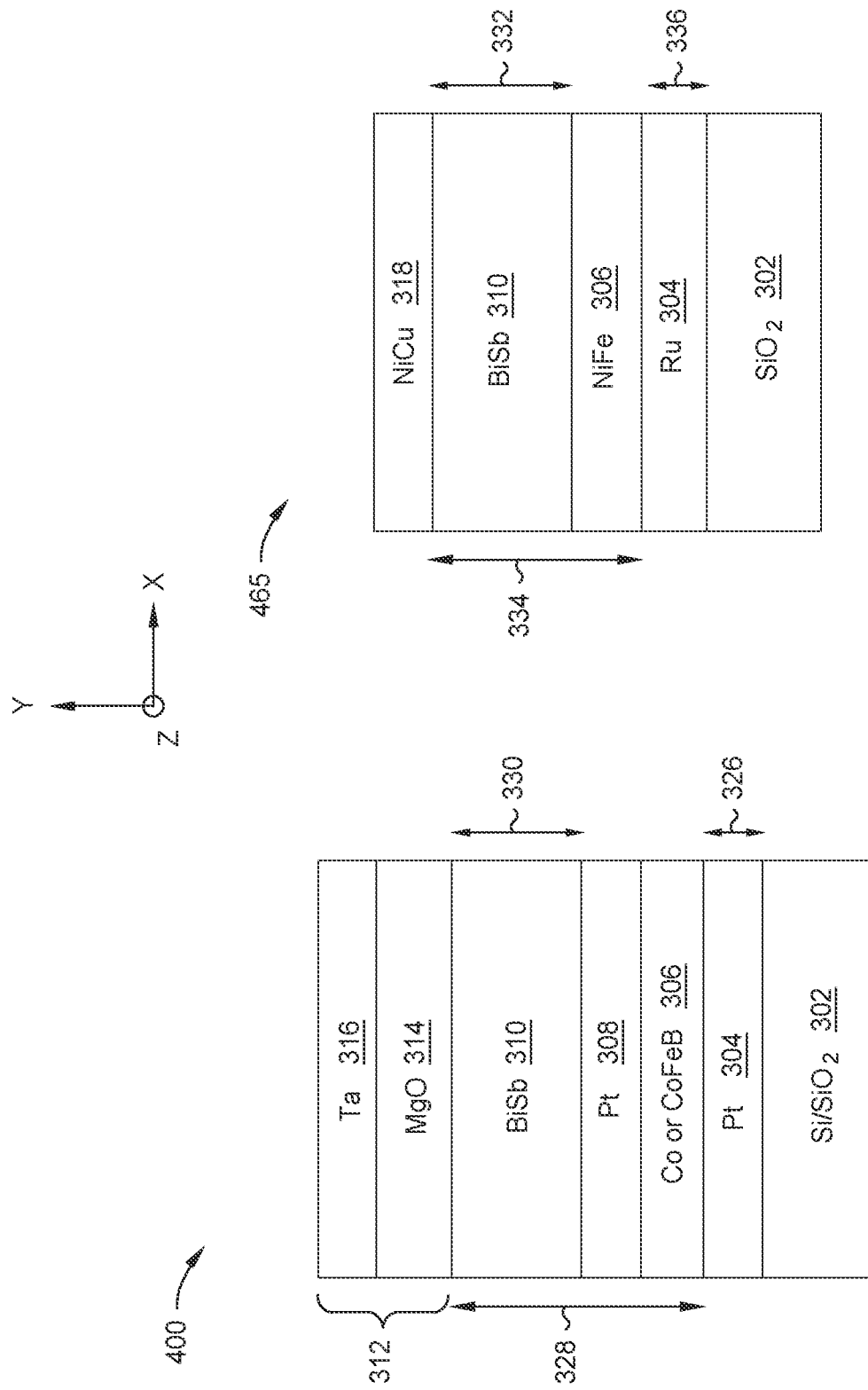

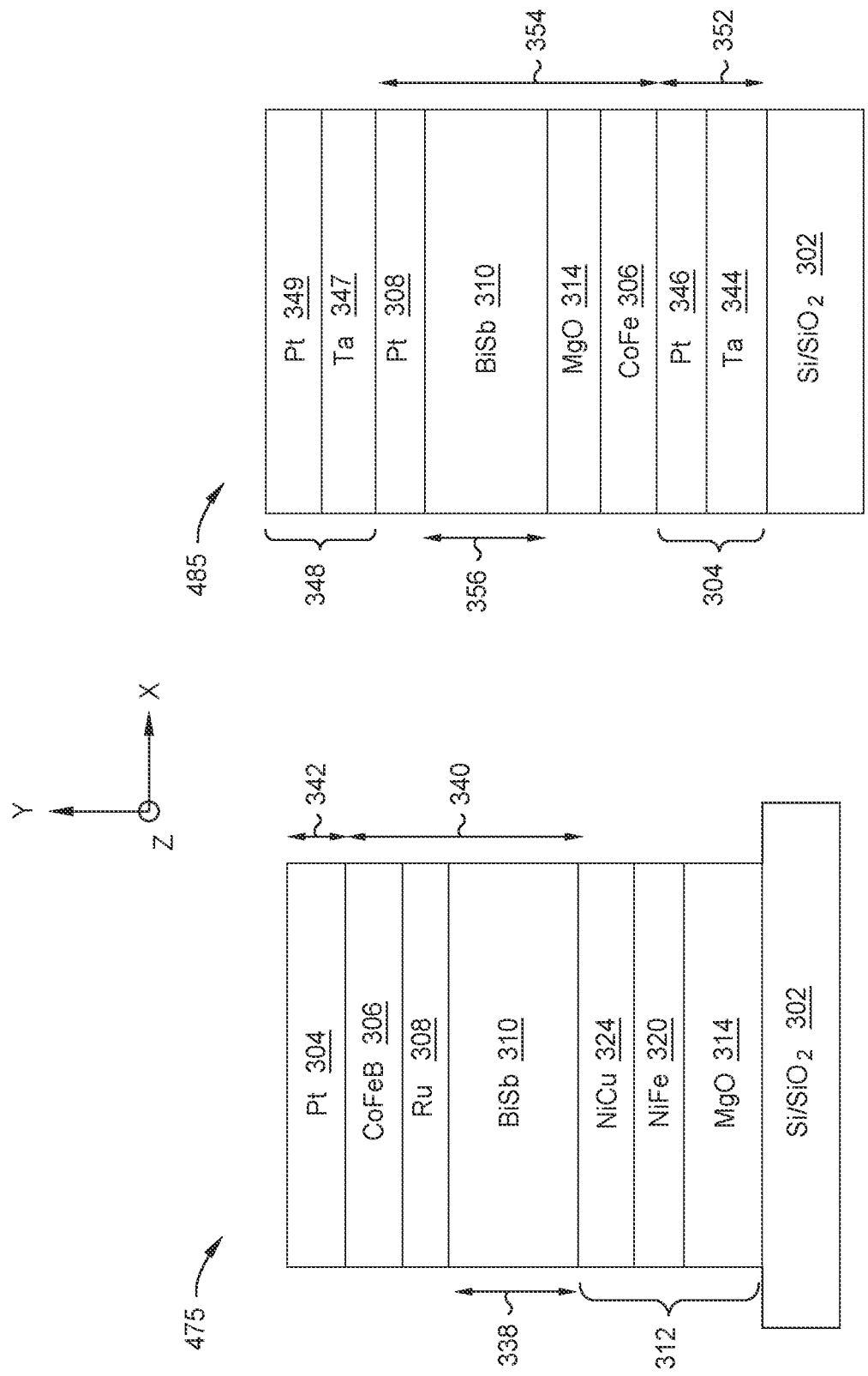

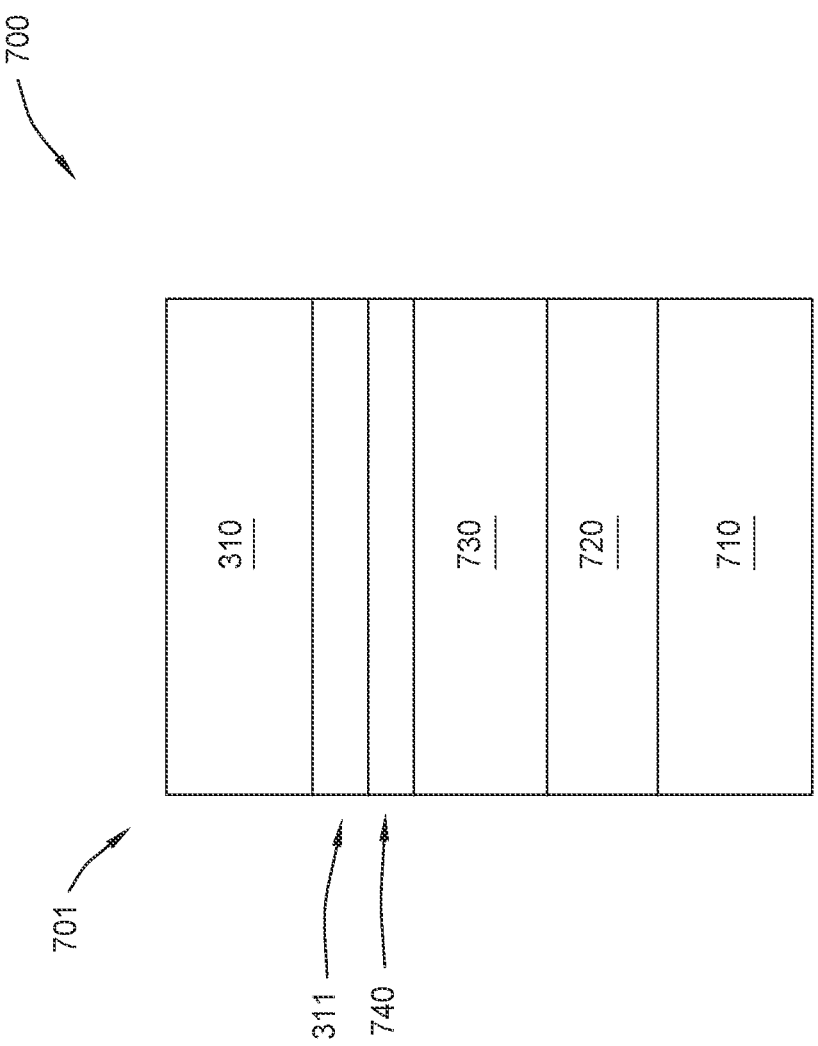

SOT READER USING BISB TOPOLOGICAL INSULATOR

BACKGROUND OF THE DISCLOSURE

Field of the Disclosure

Embodiments of the present disclosure generally relate to spin-orbit torque (SOT) device comprising a bismuth antimony (BiSb) layer.

Description of the Related Art

BiSb layers are narrow band gap topological insulators with both giant spin Hall effect and high electrical conductivity. BiSb is a material that has been proposed in various spin-orbit torque (SOT) device applications, such as for a spin Hall layer for magnetoresistive random access memory (MRAM) devices and energy-assisted magnetic recording (EAMR) write heads. When SOT devices utilizing BiSb are used as a reader in the various SOT applications, the readers are often too thick, which increases its read gap and limits down track resolution of such devices. Furthermore, in order to achieve a large output with a high signal-to-noise ratio in a single SOT reader, a SOT material with large spin Hall angle and relatively low resistivity is required. However, using Pt or W as the SOT material cannot provide the necessary performance.

Therefore, there is a need for an improved SOT device utilizing BiSb layers having a decreased thickness and a high signal-to-noise ratio.

SUMMARY OF THE DISCLOSURE

The present disclosure generally relate to spin-orbit torque (SOT) devices. The SOT devices each comprise a non-magnetic layer, a free layer disposed in contact with the non-magnetic layer, and a bismuth antimony (BiSb) layer disposed over the free layer. The non-magnetic layer has a thickness of about 0.5 nm to about 2 nm. The BiSb layer has a thickness of about 5 nm to about 10 nm. The BiSb layer and the free layer have collective thickness between about 5 nm to about 20 nm. By reducing the thickness of the non-magnetic layer and BiSb layer, a read gap of each SOT device is reduced while enabling large inverse spin Hall angles and high signal-to-noise ratios.

In one embodiment, a spin-orbit torque (SOT) device comprises a first non-magnetic layer, a first free layer disposed in contact with the first non-magnetic layer, and a first BiSb layer disposed over the first free layer, wherein the first BiSb layer and the first free layer have collective thickness between about 5 nm to about 20 nm.

In another embodiment, a SOT device comprises a shield comprising a magnetic material, a non-magnetic layer having a thickness between about 0.5 nm to about 5 nm disposed on the shield, a free layer disposed in contact with the non-magnetic layer, and a BiSb layer having a (012) orientation disposed over the free layer.

In yet another embodiment, a SOT device comprises a substrate comprising a magnetic material, a non-magnetic layer having a thickness between about 0.5 nm to about 5 nm disposed on the substrate, wherein the non-magnetic layer comprises Pt, Ru, Ta, MgO, or a combination thereof, a free layer disposed in contact with the non-magnetic layer, the free layer comprising Co, CoFeB, NiFe, or CoFe, an interlayer disposed in contact with the free layer, and a BiSb layer disposed in contact with the interlayer, wherein the BiSb layer, the interlayer, and the free layer have collective thickness less than or equal to about 17 nm.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A-3D illustrate SOT devices, according to various embodiments.

FIG. 3E illustrates a dual SOT device, according to one embodiment.

FIGS. 4A-4D illustrate exemplary embodiments of SOT devices based on the SOT devices of FIGS. 3A-3D, according to various embodiments.

FIG. 7 is a schematic cross-sectional view of a SOT used as a MRAM device.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relate to spin-orbit torque (SOT) devices. The SOT devices each comprise a non-magnetic layer, a free layer disposed in contact with the non-magnetic layer, and a bismuth antimony (BiSb) layer disposed over the free layer. The non-magnetic layer has a thickness of about 0.5 nm to about 2 nm. The BiSb layer has a thickness of about 5 nm to about 10 nm. The BiSb layer and the free layer have collective thickness between about 5 nm to about 20 nm. By reducing the thickness of the non-magnetic layer and BiSb layer, a read gap of each SOT device is reduced while enabling large inverse spin Hall angles and high signal-to-noise ratios.

A BiSb layer having a (012) orientation has a large spin Hall angle effect and high electrical conductivity. A BiSb layer having a (012) orientation can be used to form a spin-orbit torque (SOT) device. For example, a BiSb layer having a (012) orientation can be used as a spin Hall layer in a spin-orbit torque device in a magnetic recording head, e.g., as part of a read head, and/or a microwave assisted magnetic recording (MAMR) write head. In another example, a BiSb layer having a (012) orientation can be used as a spin Hall electrode layer in a magnetoresistive random access memory (MRAM) device. The SOT device can be in a perpendicular stack configuration or an in-plane stack configuration. The SOT device can be utilized in, for example, MAMR writing heads, in MRAM, in artificial intelligence chips, and in other applications. A BiSb layer stack with a (012) orientation has a higher spin Hall angle and higher performance in a SOT device than a BiSb layer with a (001) orientation.

Figure 1:
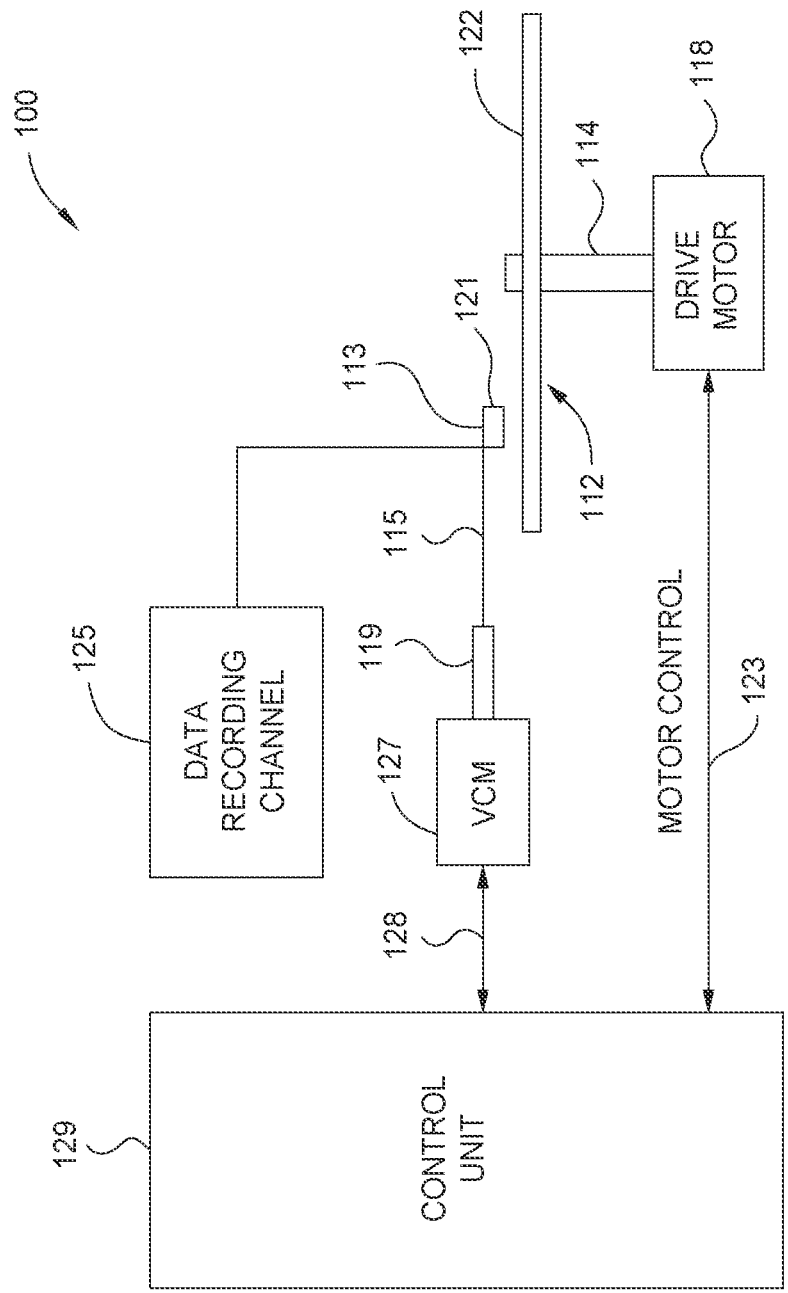
FIG. 1 is a schematic illustration of certain embodiments of a magnetic media drive including a magnetic recording head having a SOT device.

FIG. 1 is a schematic illustration of certain embodiments of a magnetic media drive 100 including a magnetic recording head having a SOT device. Such a magnetic media drive may be a single drive or comprise multiple drives. For the sake of illustration, a single disk drive 100 is shown according to certain embodiments. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

Figure 2:
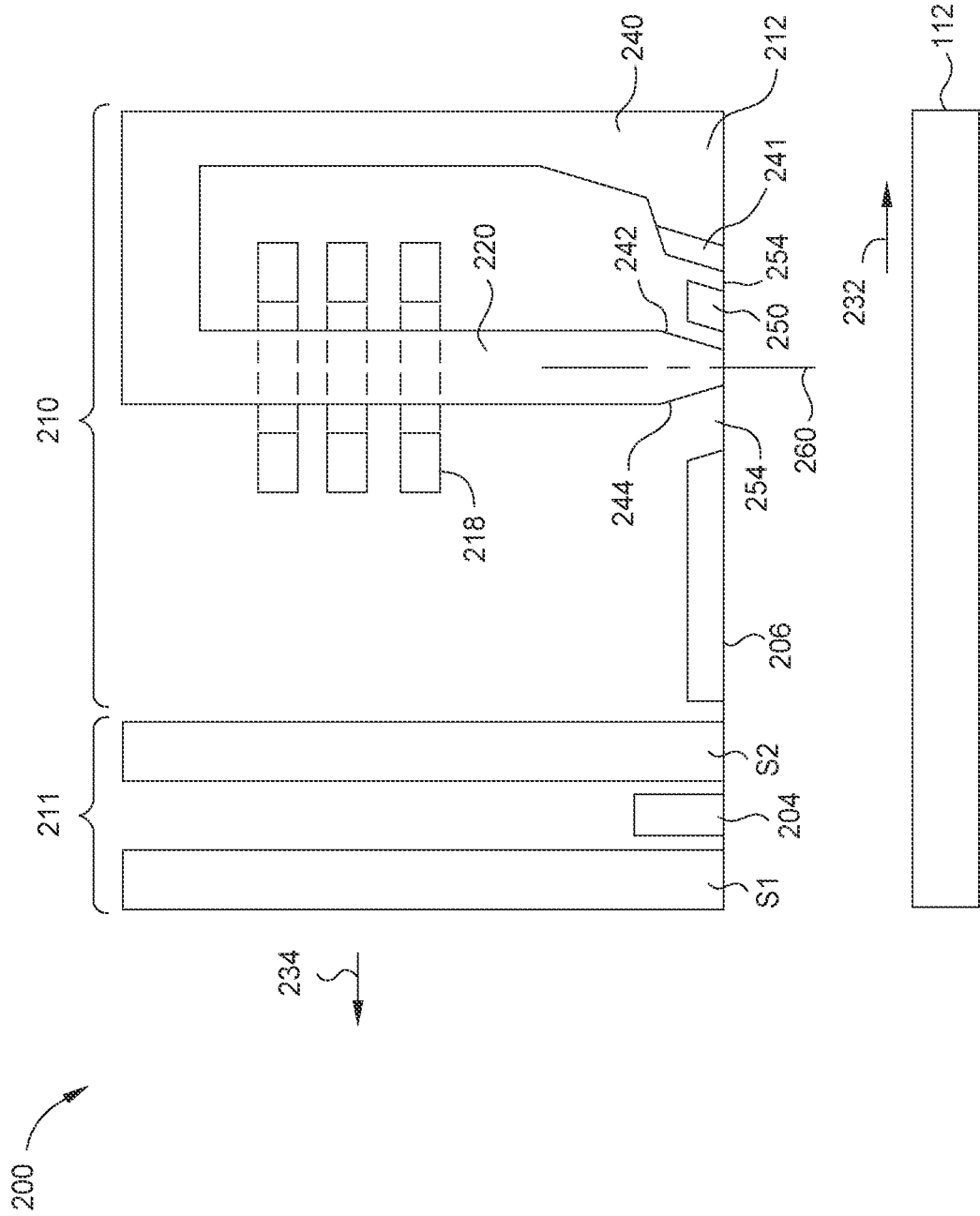
FIG. 2 is a fragmented, cross-sectional side view of certain embodiments of a read/write head having a SOT device.

At least one slider 113 is positioned near the magnetic disk 112, each slider 113 supporting one or more magnetic head assemblies 121 that include a SOT device. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 2 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media drive and the accompanying illustration of FIG. 1 are for representation purposes only. It should be apparent that magnetic media drives may contain a large number of media, or disks, and actuators, and each actuator may support a number of sliders. It is to be understood that the embodiments discussed herein are applicable to a data storage device such as a hard disk drive (HDD) as well as a tape drive, such as those conforming to the LTO (Linear Tape Open) standards. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

FIG. 2 is a fragmented, cross-sectional side view of certain embodiments of a read/write head 200 having a SOT device. It is noted while an SOT device is shown in both the read head and write head, this is for illustrative purposes only, and an SOT device may be independently integrated into either only the read head or only the write head in various embodiments, or in both the read head and the write head. The read/write head 200 faces a magnetic media 112. The read/write head 200 may correspond to the magnetic head assembly 121 described in FIG. 1. The read/write head 200 includes a media facing surface (MFS) 212, such as a gas bearing surface, facing the disk 112, a write head 210, and a magnetic read head 211. As shown in FIG. 2, the magnetic media 112 moves past the write head 210 in the direction indicated by the arrow 232 and the read/write head 200 moves in the direction indicated by the arrow 234.

In some embodiments, the magnetic read head 211 is a SOT read head that includes an SOT sensing element 204 located between SOT shields S1 and S2. The magnetic fields of the adjacent magnetized regions in the magnetic disk 112 are detectable by the SOT sensing element 204 as the recorded bits. In SOT sensing elements 204 comprising a BiSb layer, such as the SOT devices described in FIGS. 3A-3E and 4A-4D, current flows perpendicular to the film plane, and the signal is read out by measuring the voltage in the BiSb layer generated by the inverse spin Hall effect. The SOT device of various embodiments can be incorporated into the read head 211.

The write head 210 includes a main pole 220, a leading shield 206, a trailing shield 240, and a coil 218 that excites the main pole 220. The coil 218 may have a "pancake" structure which winds around a back-contact between the main pole 220 and the trailing shield 240, instead of a "helical" structure shown in FIG. 2. In one embodiment, the write head 210 is a perpendicular magnetic recording (PMR) write head. In other embodiments, the write head 210 may use energy assisted magnetic recording (EAMR) technologies such as microwave assisted magnetic recording (MAMR) and heat assisted magnetic recording (HAMR).

In FIG. 2, a spin orbital torque (SOT) device 250 is shown as part of the write head structure to enable a MAMR recording effect, in one embodiment. As noted above, while an SOT device is shown in FIG. 2 for both the read head and the write head, the SOT devices are not required to be implemented in both. The SOT device 250 is formed in a gap 254 between the main pole 220 and the trailing shield 240. The main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree of taper, and the degree of taper is measured with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown), and the trailing side and the leading side are substantially parallel. The main pole 220 may be a magnetic material, such as a FeCo alloy. The leading shield 206 and the trailing shield 240 may be a magnetic material, such as a NiFe alloy. In certain embodiments, the trailing shield 240 can include a trailing shield hot seed layer 241. The trailing shield hot seed layer 241 can include a high moment sputter material, such as CoFeN or FeXN, where X includes at least one of Rh, Al, Ta, Zr, and Ti. In certain embodiments, the trailing shield 240 does not include a trailing shield hot seed layer.

FIGS. 3A-3D illustrate spin-orbit torque (SOT) devices 300, 365, 375, 385, according to various embodiments. The SOT devices 300, 365, 375, 385 may each individually be used in the magnetic recording head of the drive 100 of FIG. 1, the read head 211 and/or write head 210 of FIG. 2, or other suitable magnetic media drives. When the SOT device 300, 365, 375, 385 are used in a write head, the current flows in-plane to the BiSb layer, and the ferromagnetic or free layer is oscillated by the SOT generated by the spin Hall effect in the BiSb layer. Aspects of each SOT device 300, 365, 375, 385 may be used in combination with one another. As such, FIGS. 4A-4D illustrate various embodiments of SOT devices 400, 465, 475, 485 that correspond to the SOT devices 300, 365, 375, and 385.

The SOT device 300 of FIG. 3A comprises a substrate 302, a non-magnetic (NM) layer 304 disposed on the substrate 302, a free layer (FL) 306 disposed on the NM layer 304, an interlayer 308 disposed on the FL 306, a spin Hall effect (SHE) layer 310 disposed on the interlayer 308, and a cap layer 312 disposed on the SHE layer 310. The cap layer 312 may comprise one or more sublayers. In the SOT device 300, the cap layer 312 comprises a first sublayer 314 and a second sublayer 316. The substrate 302 may be a shield. When the SOT device 300 is used within a read head, such as the read head 211 of FIG. 2, a bottom shield (not shown) is disposed below the substrate 302 and a top shield (not shown) is disposed on the cap layer 312. In such embodiments, the bottom shield and the top shield each individually comprise a magnetic material.

The substrate 302 may comprise a magnetic material, such as NiFe. The NM layer 304 may comprise Pt, Ru, Ta, MgO, or a combination thereof. The FL 306 may comprise CoFeB, Co, CoFe, or NiFe. The interlayer 308 may comprise Ru or Pt. The SHE layer 310 comprises BiSb. The BiSb may have a (012) crystal orientation. The material of the interlayer 308 may be selected to prohibit or minimize Sb migration from the BiSb SHE layer 310. The first sublayer 314 may be an MgO layer. The second sublayer 316 may comprise Ta or Pt, for example. When current 321 is applied to the SOT device 300, the current 321 flows in the y-direction from the substrate 302 to the cap layer 312 with reflected spin current flowing into the BiSb SHE layer 310 when reflected at the interface between the interlayer 308 and the FL 306, or in the -y-direction from the cap layer 312 to the substrate 302 with direct spin current flowing into the BiSb SHE layer 310 from the FL 306.

The NM layer 304 has a thickness 326 in the y-direction of about 0.5 nm to about 5 nm, such as about 1 nm. When the SOT device 300 is used within a read head, a lower surface 304a of the NM 304 disposed in contact with the substrate 302 may define a lower boundary for a read gap (RG) of the SOT device 300, and an upper surface 316a of the second sublayer 316 may define an upper boundary for the read gap. The SHE layer 310 has a thickness 330 in the y-direction of about 4 nm to about 10 nm, such as about 5 nm. A combined thickness 328 of the FL 306, the interlayer 308, and the SHE layer 310 is less than about 20 nm, such as about 10 nm.

It is to be further understood that a plurality of the SOT devices 300 can be configured together as part of a memory cell array in which the BiSb layer 310 is a spin orbit material electrode. A top electrode (not shown) can be disposed over the cap layer 312. Each of the memory cells may be part of a two-terminal device or a three terminal device. The spin orbit material electrode and the top electrode may serve as bit lines, word lines, read word lines, write word lines, and combinations thereof. The memory cell array may be implemented as a cross-point array or other architectures.

The SOT device 365 of FIG. 3B comprises a substrate 302, a NM layer 304 disposed on the substrate 302, a FL 306 disposed on the NM layer 304, a SHE layer 310 disposed on the FL 306, and a cap layer 318 disposed on the SHE layer 310. The substrate 302 may comprise a magnetic material, such as NiFe. The NM layer 304 may comprise Pt, Ru, Ta, MgO, or a combination thereof. The FL 306 may comprise CoFeB, Co, CoFe, or NiFe. The cap layer 318 comprises a material selected from the group consisting of SiN, TiN, Al₂O₃, SiO₂, NiFeTa, NiTa, NiW, NiFeW, CoHf, CoFeHf, Pt, Co, Cu, Ni, NiCu, CoCu, Ru, Ta, Cr, Au, Rh, other non-magnetic materials, and combinations thereof. The substrate 302 may be a shield. When the SOT device 365 is used within a read head, such as the read head 211 of FIG. 2, a bottom shield (not shown) is disposed below the substrate 302 and a top shield (not shown) is disposed on the cap layer 318. In such embodiments, the bottom shield and the top shield each individually comprise a magnetic material. When current 321 is applied to the SOT device 365, the current 321 flows in the y-direction from the substrate 302 to the cap layer 318 with reflected spin current flowing into the BiSb SHE layer 310 when reflected by the FL 306, or in the -y-direction from the cap layer 318 to the substrate 302 with direct spin current flowing into the BiSb SHE layer 310 from the FL 306.

The NM layer 304 has a thickness 336 in the y-direction of about 0.5 nm to about 5 nm, such as about 1 nm. When the SOT device 350 is used within a read head, a lower surface 304a of the NM 304 disposed in contact with the substrate 302 may define a lower boundary of a read gap (RG) of the SOT device 365, and an upper surface 318a of the cap layer 318 may define an upper boundary of the read gap. The SHE layer 310 has a thickness 332 in the y-direction of about 4 nm to about 10 nm, such as about 5 nm. A combined thickness 334 of the FL 306 and the SHE layer 310 is less than about 20 nm, such as about 10 nm.

It is to be further understood that a plurality of the SOT devices 350 can be configured together as part of a memory cell array in which the BiSb layer 310 is a spin orbit material electrode. A top electrode (not shown) can be disposed over the cap layer 318. Each of the memory cells may be part of a two-terminal device or a three terminal device. The spin orbit material electrode and the top electrode may serve as bit lines, word lines, read word lines, write word lines, and combinations thereof. The memory cell array may be implemented as a cross-point array or other architectures.

The SOT device 375 of FIG. 3C comprises a substrate 302, a seed layer 322 disposed on the substrate 302, a SHE layer 310 disposed on the seed layer 322, an interlayer 308 disposed on the SHE layer 310, a FL 306 disposed on the interlayer 308, and a NM layer 304 disposed on the FL 306. The seed layer 322 may comprise one or more interlayers. For example, the seed layer 322 may comprise a first sublayer 314, a second sublayer 320, and a third sublayer 324. In some embodiments, the NM layer 304 of the SOT device 375 may be a cap layer. The substrate 302 may be a shield. When the SOT device 375 is used within a read head, such as the read head 211 of FIG. 2, a bottom shield (not shown) is disposed below the substrate 302 and a top shield (not shown) is disposed on the NM layer 304. In such embodiments, the bottom shield and the top shield each individually comprise a magnetic material. When current 321 is applied to the SOT device 375, the current 321 flows in the y-direction from the substrate 302 to the NM layer 304 with direct spin current flowing into the BiSb SHE layer 310 from the FL 306, or in the -y-direction from the NM layer 304 to the substrate 302 with reflected spin current flowing into the BiSb SHE layer 310 when reflected at the interface between the interlayer 308 and the FL 306.

The substrate 302 may comprise a magnetic material, such as NiFe. The first sublayer 314 of the seed layer 322 may be an MgO layer. The second sublayer 320 may comprise NiFe, and the third sublayer 324 may comprise NiCu. The SHE layer 310 comprises BiSb. The BiSb may have a (012) crystal orientation. The interlayer 308 may comprise Ru or Pt. The material of the interlayer 308 may be selected to prohibit or minimize Sb migration from the BiSb SHE layer 310. The FL 306 may comprise CoFeB, Co, CoFe, or NiFe. The NM layer 304 may comprise Pt, Ru, Ta, MgO, or a combination thereof.

The SHE layer 310 has a thickness 338 in the y-direction of about 4 nm to about 10 nm, such as about 5 nm. The NM layer 304 has a thickness 342 in the y-direction of about 0.5 nm to about 5 nm, such as about 1 nm. When the SOT device 375 is used within a read head, an upper surface 304a of the NM layer 304 may define an upper boundary of a read gap (RG) of the SOT device 375, and a lower surface 314a of the first sublayer 314 may define a lower boundary of the read gap. A combined thickness 340 of the FL 306, the interlayer 308, and the SHE layer 310 is less than about 20 nm, such as about 10 nm.

In one embodiment, the seed layer 322 comprises an amorphous conditioning layer and a growth B2 or bcc (100) texturing layer over the amorphous conditioning layer. For example, the amorphous conditioning layer and a growth B2 or bcc (100) texturing layer may be part of the first sublayer 314, or the amorphous conditioning layer and a growth B2 or bcc (100) texturing layer may be disposed between the first sublayer 314 and the substrate 302, or between the first sublayer 314 and the second sublayer 320. The amorphous conditioning layer is comprised of alloys selected from the group consisting of NiTa, NiFeTa, CoHf, CoFeHf, NiW, NiFeW, CoHfB, CoFeB, CoZrTa, NiFeB, CoB, FeB, and alloy combinations thereof, wherein the alloy combination is an alloy of elements selected from the group consisting of Ni, Fe, Co, Zr, W, Ta, Hf, Ag, Pt, Pd, Si, Ge, Mn, Al, Ti, and combinations thereof. The texturing (100) layer may be a material selected from B2 RuAl phase, or heated (temperature 100° C.-300° C.) CrX alloys, wherein X=Ru, Mo, W, or Ti<=10 at. %, or CrX alloys in combinations with other B2 phase materials like NiAl or RhAl. In another embodiment, the interlayer 308 comprises the growth B2 or bcc (100) texturing layer or MgO.

It is to be further understood that a plurality of the SOT devices 375 can be configured together as part of a memory cell array in which the BiSb layer 310 is a spin orbit material electrode. A top electrode (not shown) can be disposed over the NM layer 304. Each of the memory cells may be part of a two-terminal device or a three terminal device. The spin orbit material electrode and the top electrode may serve as bit lines, word lines, read word lines, write word lines, and combinations thereof. The memory cell array may be implemented as a cross-point array or other architectures.

The SOT device 385 of FIG. 3D comprises a substrate 302, a NM layer 304 disposed on the substrate 302, a FL layer 306 disposed on the NM layer 304, an MgO layer 314 disposed on the FL layer 306, a SHE layer 310 disposed on the MgO layer 314, an interlayer 308 disposed on the SHE layer 310, and a cap layer 348 disposed on the interlayer 308. The NM layer 304 comprises a first sublayer 344 and a second sublayer 346, where the NM layer 304 has a total thickness 352 in the y-direction of about 0.5 nm to about 5 nm, such as about 1 nm. The first sublayer 344 may comprise Ta or MgO, and the second sublayer 346 may comprise Pt or MgO. When the SOT device 385 is used within a read head, a lower surface 344a of the first sublayer 344 of the NM layer 304 may define a lower boundary for a read gap (RG) of the SOT device 385, and an upper surface 348a of a cap layer 348 may define an upper boundary for the read gap. The substrate 302 may be a shield. When the SOT device 385 is used within a read head, such as the read head 211 of FIG. 2, a bottom shield (not shown) is disposed below the substrate 302 and a top shield (not shown) is disposed on the cap layer 348. In such embodiments, the bottom shield and the top shield each individually comprise a magnetic material. When current 321 is applied to the SOT device 385, the current 321 flows in the y-direction from the substrate 302 to the cap layer 348 with reflected spin current flowing into the BiSb SHE layer 310 when reflected at the interface between the MgO layer 314 and the FL 306, or in the -y-direction from the cap layer 348 to the substrate 302 with direct spin current flowing into the BiSb SHE layer 310 from the FL 306.

The substrate 302 may comprise a magnetic material, such as NiFe. The SHE layer 310 comprises BiSb. The BiSb may have a (012) crystal orientation. The interlayer 308 may comprise Ru, Pt, the growth B2 or bcc (100) texturing layer, or MgO. The material of the interlayer 308 may be selected to prohibit or minimize Sb migration from the BiSb SHE layer 310. The cap layer 348 comprises a material selected from the group consisting of SiN, TiN, $Al_2O_3$, $SiO_2$, NiFeTa, NiTa, NiW, NiFeW, CoHf, CoFeHf, Pt, Co, Cu, Ni, NiCu, CoCu, Ru, Ta, Cr, Au, Rh, other non-magnetic materials, and combinations thereof. The cap layer 348 may comprise one or more sublayers.

The SHE layer 310 has a thickness 356 in the y-direction of about 4 nm to about 10 nm, such as about 5 nm. A combined thickness 354 of the FL 306, the MgO layer 314, and the SHE layer 310 is less than about 20 nm, such as about 10 nm.

It is to be further understood that a plurality of the SOT devices 385 can be configured together as part of a memory cell array in which the BiSb layer 310 is a spin orbit material electrode. A top electrode (not shown) can be disposed over the cap layer 348. Each of the memory cells may be part of a two-terminal device or a three terminal device. The spin orbit material electrode and the top electrode may serve as bit lines, word lines, read word lines, write word lines, and combinations thereof. The memory cell array may be implemented as a cross-point array or other architectures.

In each SOT device 300, 365, 375, 385, a BiSb layer having a (012) orientation has a large spin Hall angle effect and high electrical conductivity. In addition to a BiSb layer having a (012) orientation being used to form SOT devices, a BiSb layer having a (012) orientation can be used as a spin Hall layer in a spin-orbit torque device in a magnetic recording head, e.g., as part of a read head, and/or a microwave assisted magnetic recording (MAMR) write head. In another example, a BiSb layer having a (012) orientation can be used as a spin Hall electrode layer in a magnetoresistive random access memory (MRAM) device. The SOT device can be utilized in, for example, MAMR writing heads, in MRAM, in artificial intelligence chips, and in other applications. A BiSb layer stack 310 with a (012) orientation has a higher spin Hall angle and higher performance in a SOT device than a BiSb layer with a (001) orientation.

FIG. 3E illustrates a dual SOT device 395, according to one embodiment. The dual SOT device 395 may comprise two of the SOT devices 300 of FIG. 3A, two of the SOT devices 365 of FIG. 3B, two of the SOT devices 375 of FIG. 3C, or two of the SOT devices 385 of FIG. 3D. As such, the dual SOT device 395 may include additional layers not shown, such as an interlayer 308. The dual SOT device 395 may be used in the magnetic recording head of the drive 100 of FIG. 1, the read head 211 and/or write head 210 of FIG. 2, or other suitable magnetic media drives.

The dual SOT device 395 comprises a first shield (S1) 302a, a first SHE layer (SHE1) 310a disposed on the first shield 302a, a first free layer (FL1) 306a disposed on the first SHE layer 310a, a first NM layer (NM1) 304a disposed on the first free layer 306a, a second NM layer (NM2) 304b disposed on the first NM layer 304a, a second free layer (FL2) 306b disposed on the second NM layer 304b, a second SHE layer (SHE2) 310b disposed on the second free layer 306b, and a second shield (S2) 302b disposed on the second SHE layer 310b. A read gap 305 of the SOT device 395 is defined from a center of the first FL1 306a to a center of the second FL2 306b. The read gap 305 has a thickness in the y-direction of about 5 nm to about 25 nm.

The first shield 302a and the second shield 302b may each individually be the substrate 302 of FIGS. 3A-3D, the first SHE layer 310a and the second SHE layer 310b may each individually be in the SHE layer 310 of FIGS. 3A-3D, the first NM layer 304a and the second NM layer 304b may each individually be the NM layer 304 of FIGS. 3A-3D, and the first free layer 306a and the second free layer 306b may each individually be the free layer 306 of FIGS. 3A-3D.

FIGS. 4A-4D illustrate exemplary embodiments of SOT devices 400, 465, 475, 485 based on the SOT devices 300, 365, 375, 385 of FIGS. 3A-3D, according to various embodiments. The SOT devices 400, 465, 475, 485 may each individually be used in the magnetic recording head of the drive 100 of FIG. 1, the read head 211 and/or write head 210 of FIG. 2, or other suitable magnetic media drives. Aspects of each SOT device 400, 465, 475, 485 may be used in combination with one another. The SOT device 400 of FIG. 4A corresponds to the SOT device 300 of FIG. 3A, the SOT device 465 of FIG. 4B corresponds to the SOT device 365 of FIG. 3B, the SOT device 475 of FIG. 4C corresponds to the SOT device 375 of FIG. 3C, and the SOT device 485 of FIG. 4D corresponds to the SOT device 385 of FIG. 3D.

In the SOT device 400 of FIG. 4A, the substrate 302 comprises Si and/or $SiO_2$, the NM layer 304 comprises Pt or MgO having a thickness 326 in the y-direction of about 0.5 nm to about 1.5 nm, such as about 1.0 nm, the free layer 306 comprises Co or CoFeB having a thickness in the y-direction of about 0.5 nm to about 1.5 nm, such as about 1.0 nm, and the interlayer 308 comprises Pt having a thickness in the y-direction of about 0.5 nm to about 1.5 nm, such as about 1.0 nm. The SHE layer 310 comprises BiSb having a thickness 330 in the y-direction of about 4 nm to about 10 nm, such as about 5 nm. The first sublayer 314 of the cap layer 312 comprises MgO having a thickness in the y-direction of about 0.5 nm to about 1.5 nm, such as about 1.0 nm, and a second sublayer 316 of the cap layer 312 comprises Ta having a thickness in the y-direction of about 0.5 nm to about 1.5 nm, such as about 1.0 nm. Thus, a total thickness 328 of the SHE layer 310, the interlayer 308, and the free layer 306 in the y-direction is between about 5 nm to about 13 nm. When the SOT device 400 is used within a read head, such as the read head 211 of FIG. 2, the substrate 302 may be a shield comprising a magnetic material, and a top shield comprising a magnetic material may be disposed over the second sublayer 316 of the cap layer 312.

In the SOT device 465 of FIG. 4B, the substrate 302 comprises $SiO_2$, the NM layer 304 comprises Ru or MgO having a thickness 336 in the y-direction of about 0.5 nm to about 1.5 nm, such as about 1.0 nm, and the free layer 306 comprises NiFe having a thickness in the y-direction of about 0.5 nm to about 1.5 nm, such as about 1.0 nm. The SHE layer 310 comprises BiSb having a thickness 332 in the y-direction of about 4 nm to about 10 nm, such as about 5 nm. The cap layer 318 comprises NiCu having a thickness in the y-direction of about 0.5 nm to about 1.5 nm, such as about 1.0 nm. Thus, a total thickness 334 of the SHE layer 310 and the free layer 306 in the y-direction is between about 4.5 nm to about 11.5 nm. When the SOT device 465 is used within a read head, such as the read head 211 of FIG. 2, the substrate 302 may be a shield comprising a magnetic material, and a top shield comprising a magnetic material may be disposed over the cap layer 318.

In the SOT device 475 of FIG. 4C, the substrate 302 comprises Si and/or $SiO_2$, the cap layer 312 comprises a first sublayer 314 of MgO having a thickness in the y-direction of about 7 nm to about 15 nm, a second sublayer 320 of NiFe having a thickness in the y-direction of about 3 Å to about 7 Å, and a third sublayer 324 of NiCu having a thickness in the y-direction of about 7 Å to about 15 Å. The SHE layer 310 comprises BiSb having a thickness 338 in the y-direction of about 4 nm to about 10 nm, such as about 5 nm. The interlayer 308 comprises Ru having a thickness in the y-direction of about 0.5 nm to about 1.5 nm, such as about 1 nm. The FL 306 comprises CoFeB having a thickness in the y-direction of about 0.5 nm to about 1.5 nm, such as about 1 nm. The NM layer 304 comprises Pt or MgO having a thickness 342 in the y-direction of about 0.5 nm to about 1.5 nm, such as about 1 nm. Thus, a total thickness 340 of the SHE layer 310, the interlayer 308, and the free layer 306 in the y-direction is between about 5 nm to about 13 nm. When the SOT device 475 is used within a read head, such as the read head 211 of FIG. 2, the substrate 302 may be a shield comprising a magnetic material, and a top shield comprising a magnetic material may be disposed over the NM layer 304.

In the SOT device 485 of FIG. 4D, the substrate 302 comprises Si and/or $SiO_2$, and the NM layer 304 comprises a first sublayer 344 of Ta having a thickness in the y-direction of about 10 nm to about 18 nm, such as about 15 nm and a second sublayer 346 of Pt having a thickness in the y-direction of about 2.5 nm to about 7.5 nm, such as about 5 nm. As such, the NM layer 304 has a total thickness 352 in the y-direction of about 12 nm to about 25 nm. In some embodiments, the NM layer 304 comprises MgO instead of the two sublayers of Ta and Pt. The free layer 306 comprises CoFe having a thickness in the y-direction of about 2.5 nm to about 7.5 nm, such as about 5 nm. The MgO layer 314 has a thickness in the y-direction of about 1.0 nm to about 3.0 nm, such as about 2.0 nm. The SHE layer 310 comprises BiSb having a thickness 356 in the y-direction of about 4 nm to about 10 nm, such as about 5 nm. The interlayer 308 comprises Pt having a thickness in the y-direction of about 0.5 nm to about 1.5 nm, such as about 1 nm. The cap layer 348 comprises a first sublayer 347 of Ta having a thickness in the y-direction of about 40 nm to about 50 nm, such as about 45 nm, and a second sublayer 349 of Pt having a thickness in the y-direction of about 10 nm to about 20 nm, such as about 15 nm. Thus, a total thickness 354 of the SHE layer 310, the interlayer 308, the MgO layer 314, and the free layer 306 in the y-direction is between about 8 nm to about 22 nm. When the SOT device 485 is used within a read head, such as the read head 211 of FIG. 2, the substrate 302 may be a shield comprising a magnetic material, and a top shield comprising a magnetic material may be disposed over the second sublayer 349 of the cap layer 348.

Figure 5B:
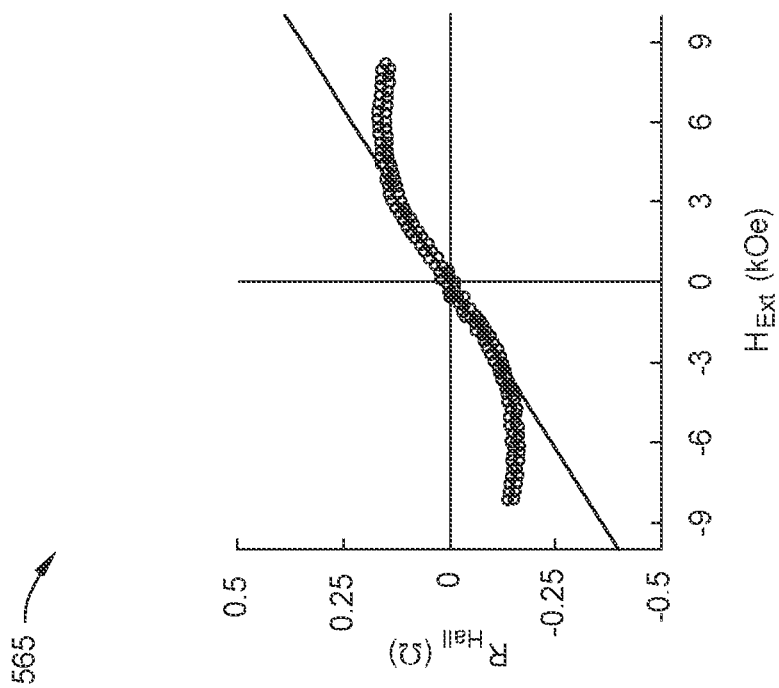
FIGS. 5A-5C illustrate graphs of DC hall resistance ($R_{hall}$) in Ohms ($\Omega$) versus perpendicular magnetic field ($H_{EXT}$) in kOe for each of the SOT devices of FIGS. 4A-4C, according to various embodiments.
Figure 5A:
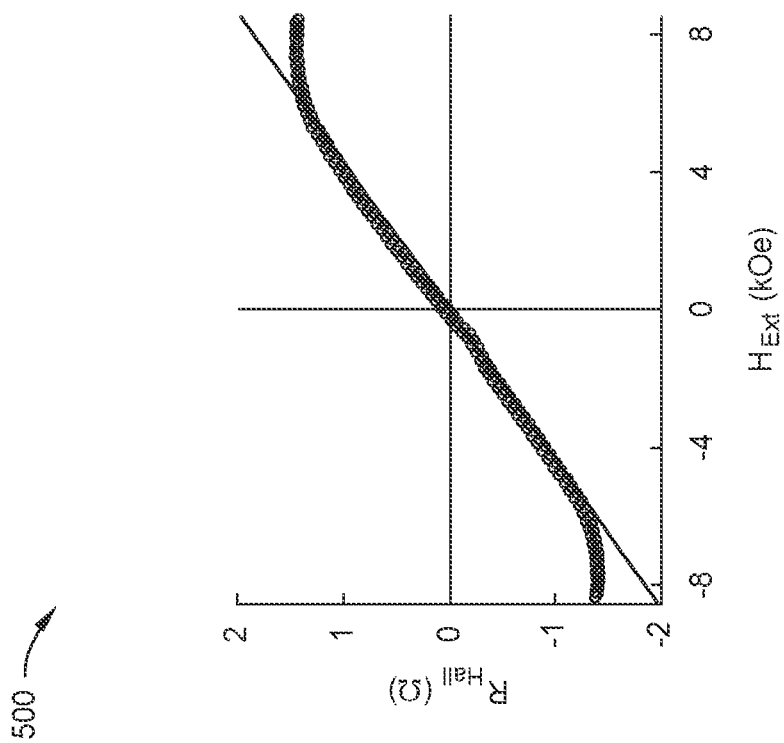
Figure 5C:
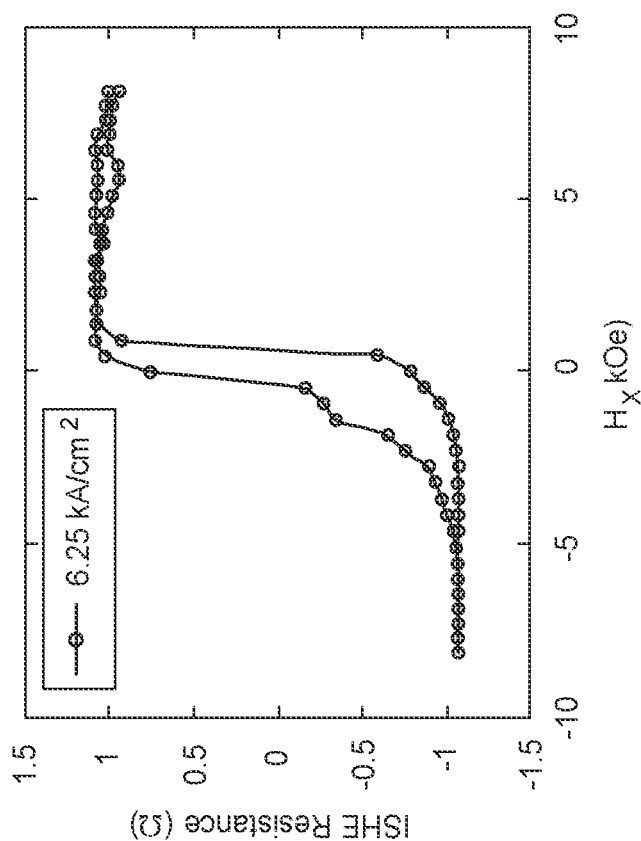
Figure 5D:
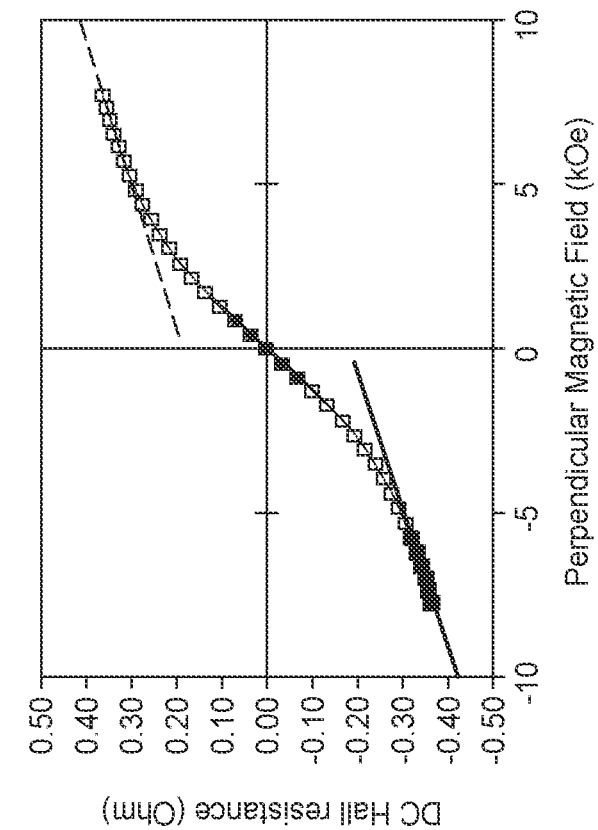
FIG. 5D illustrates a graph showing the SOT reader output of the BiSb layer of the SOT device of FIG. 4D, according to one embodiment.

FIGS. 5A-5C illustrate graphs 500, 565, and 575, respectively, of DC anomalous Hall resistance ($R_{hall}$) in Ohms ($\Omega$) versus perpendicular magnetic field ($H_{EXT}$) in kOe for each of the Hall bar of SOT devices 400, 465, and 475 of FIGS. 4A-4C, according to various embodiments. Graph 500 of FIG. 5A corresponds to the SOT device 400 of FIG. 4A, graph 565 corresponds to the SOT device 465 of FIG. 4B, and graph 575 corresponds to the SOT device 475 of FIG. 4C. The graph 585 of FIG. 5D shows a SOT reader output of the BiSb layer of the SOT device 485, based on inverse spin Hall effect as a function of external in-plane magnetic field to mimic media field under a perpendicular current density of 6.25 KA/$cm^2$.

As shown in the graph 500 of FIG. 5A, when the magnetic field is varied between about −8 kOe and about 8 kOe, the Hall resistance varies between about −1.5$\Omega$ to about 1.5$\Omega$. In the graph 565 of FIG. 5B, when the magnetic field is varied between about −9 kOe and about 9 kOe, the Hall resistance varies between about −0.5$\Omega$ to about 0.5$\Omega$. In the graph 575 of FIG. 5C, when the magnetic field is varied between about −9 kOe and about 9 kOe, the Hall resistance varies between about −0.4$\Omega$ to about 0.4$\Omega$. In each of the graphs 500, 565, 575, when the spin Hall angle of BiSb is larger than about 2, a signal-to-noise ratio of about 28 dB can be obtained, which is demonstrated in the output of the SOT reader in the graph 585 of FIG. 5D.

Thus, by reducing the thickness of the non-magnetic layer and BiSb SHE layers, the read gap of each SOT device is reduced while enabling large inverse spin Hall angles and high signal-to-noise ratios. As such, the SOT devices have a smaller size without impacting their performance.

Figure 6A:
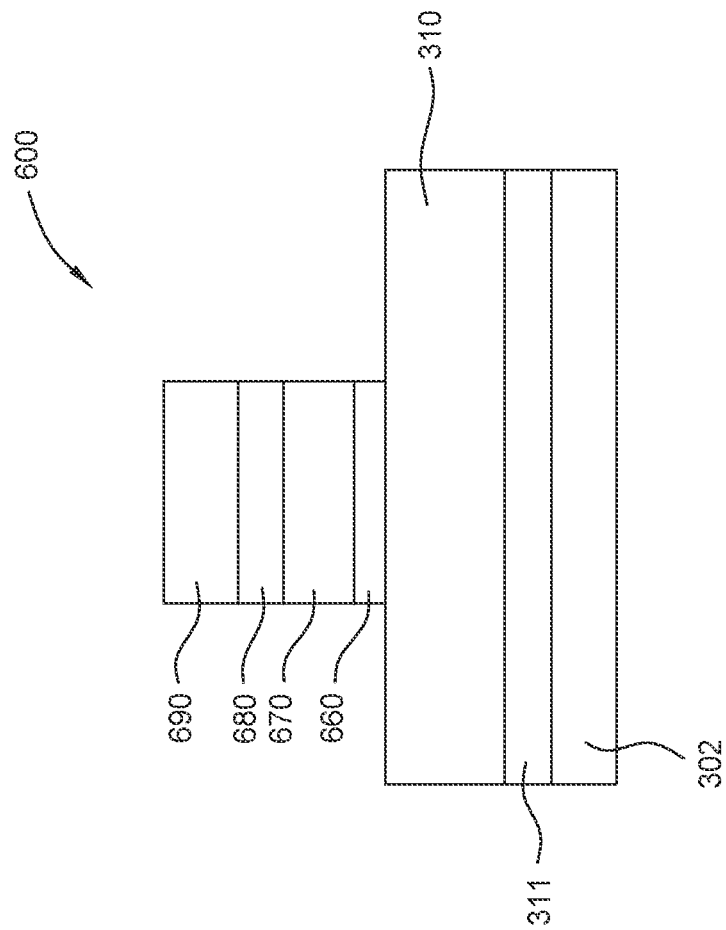
FIG. 6A is a schematic cross-sectional view of a SOT device for use in a MAMR write head, such as in the magnetic recording head of the drive of FIG. 1 or other suitable magnetic media drives.

FIG. 6A is a schematic cross-sectional view of a SOT device 600 for use in a MAMR write head, such as a MAMR write head that can be used as part of the magnetic recording head of the drive 100 of FIG. 1 or other suitable magnetic media drives. The SOT device 600 comprises a BiSb layer 310 with a (012) orientation formed over a buffer layer 311 formed over a substrate 302, such as the BiSb layer 310 of FIGS. 3A-4D. A spin torque layer (STL) 670 is formed over the BiSb layer 310. The STL 670 comprises a ferromagnetic material such as one or more layers of CoFe, Coir, NiFe, and CoFeX alloy wherein X=B, Ta, Re, or Ir. The STL 670 may be a free layer, such as the free layer 306 of FIGS. 3A-3D. As such, the STL 670 may be referred to as a free layer.

In certain embodiments, an electrical current shunt block layer 660 is disposed between the BiSb layer 310 and the STL 670. The electrical current shunt blocking layer 660 reduces electrical current from flowing from the BiSb layer 310 to the STL 670 but allows spin orbital coupling of the BiSb layer 310 and the STL 670. In certain embodiments, the electrical current shunt blocking layer 660 comprises a magnetic material which provides greater spin orbital coupling between the BiSb layer 310 and the STL 670 than a non-magnetic material. In certain embodiments, the electrical current shunt blocking layer 660 comprises a magnetic material of FeCo, FeCoM, FeCoMO, FeCoMMeO, FeCoM/MeO stack, FeCoMNiMnMgZnFeO, FeCoM/NiMnMgZnFeO stack, multiple layers/stacks thereof, or combinations thereof in which M is one or more of B, Si, P, Al, Hf, Zr, Nb, Ti, Ta, Mo, Mg, Y, Cu, Cr, and Ni, and Me is Si, Al, Hf, Zr, Nb, Ti, Ta, Mg, Y, or Cr. In certain embodiments, the electrical current shunt blocking layer 660 is formed to a thickness from about 10 Å to about 100 Å. In certain aspects, an electrical current shunt blocking layer 660 having a thickness of over 100 Å may reduce spin orbital coupling of the BiSb layer 310 and the STL 670. In certain aspects, an electrical current shunt blocking layer having a thickness of less than 10 Å may not sufficiently reduce electrical current from BiSb layer 310 to the STL 670.

In certain embodiments, additional layers are formed over the STL 670 such as a spacer layer 680 and a pinning layer 690. The pinning layer 690 can partially pin the STL 670. The pinning layer 690 comprises a single or multiple layers of PtMn, NiMn, IrMn, IrMnCr, CrMnPt, FeMn, other antiferromagnetic materials, or combinations thereof. The spacer layer 680 comprises single or multiple layers of magnesium oxide, aluminum oxide, other non-magnetic materials, or combinations thereof.

Figure 6C:
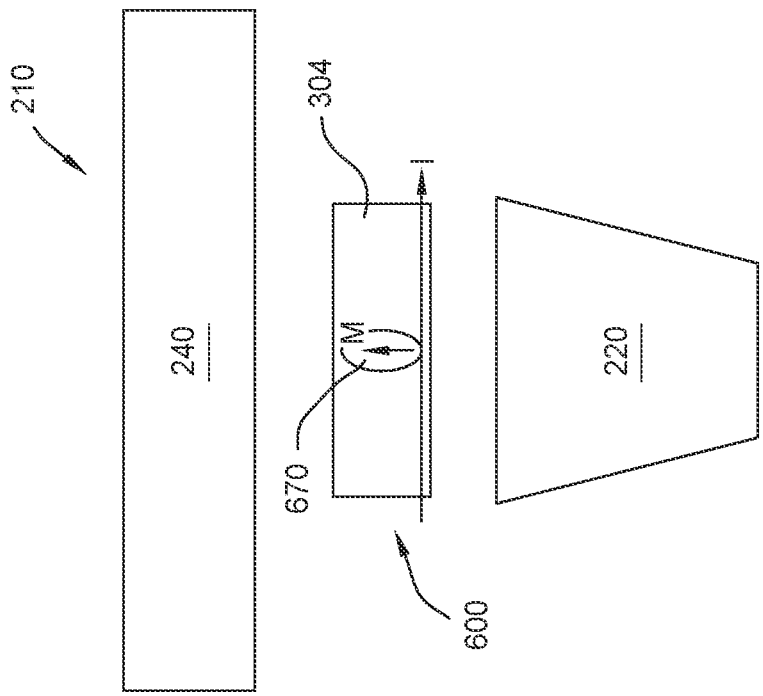
FIGS. 6B-6C are schematic MFS views of certain embodiments of a portion of a MAMR write head with a SOT device of FIG. 6A.
Figure 6B:
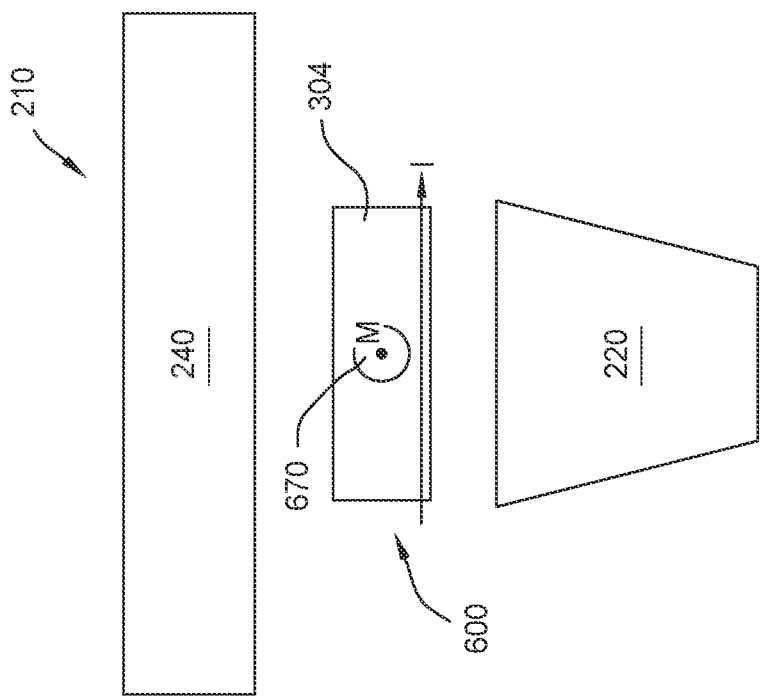

FIGS. 6B-6C are schematic MFS views of certain embodiments of a portion of a MAMR write head 210 with a SOT device 600 of FIG. 6A. The MAMR write head 210 can be the write head in FIG. 2 or other suitable write heads usable in the drive 100 of FIG. 1 or other suitable magnetic media drives such as tape drives. The MAMR write head 210 includes a main pole 220 and a trailing shield 240 in a down-track direction. The SOT device 600 is disposed in a gap between the main pole 220 and the trailing shield 240.

During operation, charge current through a BiSb layer or layer stack 310 acting as a spin Hall layer generates a spin current in the BiSb layer. The spin orbital coupling of the BiSb layer and a spin torque layer (STL) 670 causes switching or precession of magnetization of the STL 670 by the spin orbital coupling of the spin current from the BiSb layer 310. Switching or precession of the magnetization of the STL 670 can generate an assisting AC field to the write field. Energy assisted write heads based on SOT have multiple times greater power efficiency in comparison to MAMR write heads based on spin transfer torque. As shown in FIG. 6B, an easy axis of a magnetization direction of the STL 670 is perpendicular to the MFS from shape anisotropy of the STL 670, from the pinning layer 690 of FIG. 6A, and/or from hard bias elements proximate the STL 670. As shown in FIG. 6C, an easy axis of a magnetization direction of the STL 670 is parallel to the MFS from shape anisotropy of the STL 670, from the pinning layer 690 of FIG. 6A, and/or from hard bias elements proximate the STL 670.

FIG. 7 is a schematic cross-sectional view of a SOT magnetic tunnel junction (MTJ) 701 used as a MRAM device 700. The MRAM device 700 comprises a reference layer (RL) 710, a spacer layer 720 over the RL 710, a recording layer 730 over the spacer layer 720, a buffer layer 311 over an electrical current shunt block layer 740 over the recording layer 730, and a BiSb layer or layer stack 310 over the buffer layer 311. The BiSb layer 310 may be the BiSb layer 310 of FIGS. 3A-4D. The RL 710 may be a free layer, such as the free layer 306 of FIGS. 3A-3D. As such, the RL 710 may be referred to as a free layer.

The RL 710 comprises single or multiple layers of CoFe, other ferromagnetic materials, and combinations thereof. The spacer layer 720 comprises single or multiple layers of magnesium oxide, aluminum oxide, other dielectric materials, or combinations thereof. The recording layer 730 comprises single or multiple layers of CoFe, NiFe, other ferromagnetic materials, or combinations thereof.

As noted above, in certain embodiments, the electrical current shunt block layer 740 is disposed between the buffer layer 311 and the recording layer 730. The electrical current shunt blocking layer 740 reduces electrical current from flowing from the BiSb layer 310 to the recording layer 730 but allows spin orbital coupling of the BiSb layer 310 and the recording layer 730. For example, writing to the MRAM device can be enabled by the spin orbital coupling of the BiSb layer and the recording layer 730, which enables switching of magnetization of the recording layer 730 by the spin orbital coupling of the spin current from the BiSb layer 310. In certain embodiments, the electrical current shunt blocking layer 740 comprises a magnetic material which provides greater spin orbital coupling between the BiSb layer 310 and the recording layer 730 than a non-magnetic material. In certain embodiments, the electrical current shunt blocking layer 740 comprises a magnetic material of FeCoM, FeCoMO, FeCoMMeO, FeCoM/MeO stack, FeCoMNiMnMgZnFeO, FeCoM/NiMnMgZnFeO stack, multiple layers/stacks thereof, or combinations thereof, in which M is one or more of B, Si, P, Al, Hf, Zr, Nb, Ti, Ta, Mo, Mg, Y, Cu, Cr, and Ni, and Me is Si, Al, Hf, Zr, Nb, Ti, Ta, Mg, Y, or Cr.

The MRAM device 700 of FIG. 7 may include other layers, such as pinning layers, pinning structures (e.g., a synthetic antiferromagnetic (SAF) pinned structure), electrodes, gates, and other structures. Other MRAM devices besides the structure of FIG. 7 can be formed utilizing a BiSb layer 310 with a (012) orientation over a buffer layer 311 to form a SOT MTJ 701.

Therefore, by reducing the thickness of the non-magnetic layer and BiSb SHE layers, the read gap of each SOT MTJ device is reduced to between about 0.5 nm to about 5 nm while enabling large inverse spin Hall angles and high signal-to-noise ratios. As such, the SOT MTJ devices have a smaller size without impacting their performance.

In one embodiment, a spin-orbit torque (SOT) device comprises a first non-magnetic layer, a first free layer disposed in contact with the first non-magnetic layer, and a first BiSb layer disposed over the first free layer, wherein the first BiSb layer and the first free layer have collective thickness between about 5 nm to about 20 nm.

The first BiSb layer and the first free layer have collective thickness less than or equal to about 17 nm. The first non-magnetic layer has a thickness less than or equal to about 2 nm. The first free layer comprises Co, CoFeB, NiFe, or CoFe. The first non-magnetic layer comprises Pt, Ru, Ta, MgO, or a combination thereof. The SOT device further comprises an interlayer disposed between the first free layer and the first BiSb layer, wherein the first BiSb layer, the interlayer, and the first free layer have collective thickness less than or equal to about 20 nm. The SOT device further comprises a second non-magnetic layer disposed in contact with the first non-magnetic layer, a second free layer disposed in contact with the second non-magnetic layer, and a second bismuth antimony (BiSb) layer disposed over the second free layer, wherein the second BiSb layer and the second free layer have collective thickness between about 5 nm to about 20 nm. A magnetic recording head comprises a write head and a read head, the read head comprising the SOT device. A magnetic recording head comprises a write head and a read head, the write head comprising the SOT device. A magnetic recording device comprises the magnetic recording head. A magneto-resistive memory comprises the SOT device.

In another embodiment, a SOT device comprises a shield comprising a magnetic material, a non-magnetic layer having a thickness between about 0.5 nm to about 5 nm disposed on the shield, a free layer disposed in contact with the non-magnetic layer, and a BiSb layer having a (012) orientation disposed over the free layer.

The BiSb layer and the free layer have collective thickness less than or equal to about 20 nm. The SOT device further comprises an interlayer disposed between the free layer and the BiSb layer, wherein the BiSb layer, the interlayer, and the free layer have collective thickness less than or equal to about 20 nm, and a cap layer disposed over the BiSb layer. The BiSb layer has a thickness between about 5 nm to about 10 nm. The free layer comprises Co, CoFeB, NiFe, or CoFe, and wherein the non-magnetic layer comprises Pt, Ru, Ta, MgO, or a combination thereof. A magnetic recording head comprises a write head and a read head, the read head comprising the SOT device. A magnetic recording device comprises the magnetic recording head. A magneto-resistive memory comprises the SOT device.

In yet another embodiment, a SOT device comprises a substrate comprising a magnetic material, a non-magnetic layer having a thickness between about 0.5 nm to about 5 nm disposed on the substrate, wherein the non-magnetic layer comprises Pt, Ru, Ta, MgO, or a combination thereof, a free layer disposed in contact with the non-magnetic layer, the free layer comprising Co, CoFeB, NiFe, or CoFe, an interlayer disposed in contact with the free layer, and a BiSb layer disposed in contact with the interlayer, wherein the BiSb layer, the interlayer, and the free layer have collective thickness less than or equal to about 17 nm.

The non-magnetic layer comprises a first sublayer comprising Ta disposed in contact with the substrate and a second sublayer comprising Pt disposed in contact with the first sublayer and the interlayer. The SOT device further comprises a seed layer disposed on the BiSb layer. The BiSb layer has a (012) orientation. A magnetic recording head comprises a write head and a read head, the read head comprising the SOT device. A magnetic recording device comprises the magnetic recording head. A magneto-resistive memory comprises the SOT device.

While the foregoing is directed to embodiments of the present disclosure, other and further embodiments of the disclosure may be devised without departing from the basic scope thereof, and the scope thereof is determined by the claims that follow.

What is claimed is:

1. A spin-orbit torque (SOT) device, comprising:
a first non-magnetic layer;
a first free layer disposed in contact with the first non-magnetic layer;
a first bismuth antimony (BiSb) layer disposed over the first free layer; and
an interlayer disposed between the first free layer and the first BiSb layer, wherein the first BiSb layer, the interlayer, and the first free layer have collective thickness between about 5 nm to about 20 nm.

2. The SOT device of claim 1, wherein the first BiSb layer and the first free layer have collective thickness less than or equal to about 17 nm.

3. The SOT device of claim 1, wherein the first non-magnetic layer has a thickness less than or equal to about 2 nm.

4. The SOT device of claim 1, wherein the first free layer comprises Co, CoFeB, NiFe, or CoFe.

5. The SOT device of claim 1, wherein the first non-magnetic layer comprises Pt, Ru, Ta, MgO, or a combination thereof.

6. The SOT device of claim 1, further comprising:
a second non-magnetic layer disposed in contact with the first non-magnetic layer;
a second free layer disposed in contact with the second non-magnetic layer; and
a second bismuth antimony (BiSb) layer disposed over the second free layer, wherein the second BiSb layer and the second free layer have collective thickness between about 5 nm to about 20 nm.

7. A magnetic recording head comprising a write head and a read head, the read head comprising the SOT device of claim 1.

8. A magnetic recording device comprising the magnetic recording head of claim 7.

9. A magnetic recording head comprising a write head and a read head, the write head comprising the SOT device of claim 1.

10. A magnetic recording device comprising the magnetic recording head of claim 9.

11. A magneto-resistive memory comprising the SOT device of claim 1.

12. The SOT device of claim 1, wherein the first BiSb layer has a thickness between about 5 nm to about 10 nm.

13. A spin-orbit torque (SOT) device, comprising:
a shield comprising a magnetic material;
a non-magnetic layer having a thickness between about 0.5 nm to about 5 nm disposed on the shield;
a free layer disposed in contact with the non-magnetic layer;
a bismuth antimony (BiSb) layer having a (012) orientation disposed over the free layer; and
an interlayer disposed between the free layer and the BiSb layer, wherein the BiSb layer, the interlayer, and the free layer have collective thickness between about 5 nm to about 20 nm.

14. The SOT device of claim 13, wherein the BiSb layer and the free layer have collective thickness less than or equal to about 17 nm.

15. The SOT device of claim 13, further comprising:
a cap layer disposed over the BiSb layer.

16. The SOT device of claim 13, wherein the BiSb layer has a thickness between about 5 nm to about 10 nm.

17. The SOT device of claim 13, wherein the free layer comprises Co, CoFeB, NiFe, or CoFe, and wherein the non-magnetic layer comprises Pt, Ru, Ta, MgO, or a combination thereof.

18. A magnetic recording head comprising a write head and a read head, the read head comprising the SOT device of claim 13.

19. A magnetic recording device comprising the magnetic recording head of claim 18.

20. A magnetic recording head comprising a write head and a read head, the write head comprising the SOT device of claim 13.

21. A magnetic recording device comprising the magnetic recording head of claim 20.

22. A spin-orbit torque (SOT) device, comprising:
a substrate comprising a magnetic material;
a non-magnetic layer having a thickness between about 0.5 nm to about 5 nm disposed on the substrate, wherein the non-magnetic layer comprises Pt, Ru, Ta, MgO, or a combination thereof;
a free layer disposed in contact with the non-magnetic layer, the free layer comprising Co, CoFeB, NiFe, or CoFe;
an interlayer disposed in contact with the free layer; and
a bismuth antimony (BiSb) layer disposed in contact with the interlayer, wherein the BiSb layer, the interlayer, and the free layer have collective thickness less than or equal to about 17 nm.

23. The SOT device of claim 22, further comprising a seed layer disposed on the BiSb layer.

24. The SOT device of claim 22, wherein the BiSb layer has a (012) orientation.

25. A magnetic recording head comprising a write head and a read head, the read head comprising the SOT device of claim 22.

26. A magnetic recording device comprising the magnetic recording head of claim 25.

27. A magnetic recording head comprising a write head and a read head, the write head comprising the SOT device of claim 22.

28. A magnetic recording device comprising the magnetic recording head of claim 27.

29. A magneto-resistive memory comprising the SOT device of claim 22.

* * * * *